United States Patent [19]
Barth

[11] 3,944,252
[45] Mar. 16, 1976

[54] TRACTOR FRONT-END WEIGHT ASSEMBLY

[75] Inventor: Hubert Barth, Mannheim, Germany

[73] Assignee: Deere & Company, Moline, Ill.

[22] Filed: May 8, 1975

[21] Appl. No.: 575,482

[30] Foreign Application Priority Data
Sept. 13, 1974    Germany............................ 2443809

[52] U.S. Cl............................................... 280/150 E
[51] Int. Cl.²......................................... B60R 27/00
[58] Field of Search .................... 280/150 E; 212/49

[56] References Cited
UNITED STATES PATENTS
| | | | |
|---|---|---|---|
| 2,967,718 | 1/1961 | Orwig............... | 280/150 E |
| 2,986,407 | 5/1961 | Krueger................ | 280/150 E X |
| 3,635,493 | 1/1972 | Barth............... | 280/150 E |

Primary Examiner—Robert R. Song
Assistant Examiner—Michael J. Forman

[57] ABSTRACT

A bar-like base weight is fixed crosswise to the forward end of a tractor and connected thereto are two or more identical plate-shaped weights. The mounted weights are disposed in side by side abutting relationship and are held tightly against each other and in fixed relationship by a pair of clamping screws. The base weight includes a primary hitch connection which may be used when none of the weights are mounted on the base weight, and a weight-hitch connection is provided by cooperating portions of the weights when they are mounted on the base weight. Deflectors in the weights are provided to guide an implement hitch ring into hitching position in the weight-hitch connection.

9 Claims, 5 Drawing Figures

TRACTOR FRONT-END WEIGHT ASSEMBLY

BACKGROUND OF THE INVENTION

The present invention relates to a front-end weight assembly for an agricultural tractor, and more particularly relates to a weight-hitch connection.

Plate-shaped ballast weights are known which include the weight-hitch connection as shown in the U.S. Pat. No. 3,635,493 granted to Hubert Barth et al. on Jan. 18, 1972.

The prior art systems have horizontally running recessess for insertion of implement coupling hitch rings and since this allows considerable horizontal play it is difficult to bring the hitch rings directly under specific desired vertical openings proximate the recess for insertion of hitch pins. Further, due to the large amount of horizontal play, the operator who guides the hitch ring into place may be injured if the hitch ring slips to the side where he is standing while the vehicle is being backed up to hitch up the implement.

SUMMARY OF THE INVENTION

It is a general object of the present invention to provide a guide for the hitching recess on a tractor's weights so that operator injuries during the coupling procedure are prevented. This is done by the addition of deflectors to the weights to limit horizontal play of the hitch ring.

The above and additional objects and advantages of the present invention will become apparent to those skilled in the art from a consideration of the following detailed description of the preferred embodiments when taken in conjunction with the accompanying drawings.

DESCRIPTION OF THE PREFERRED EMBODIMENTS

Figure 1:
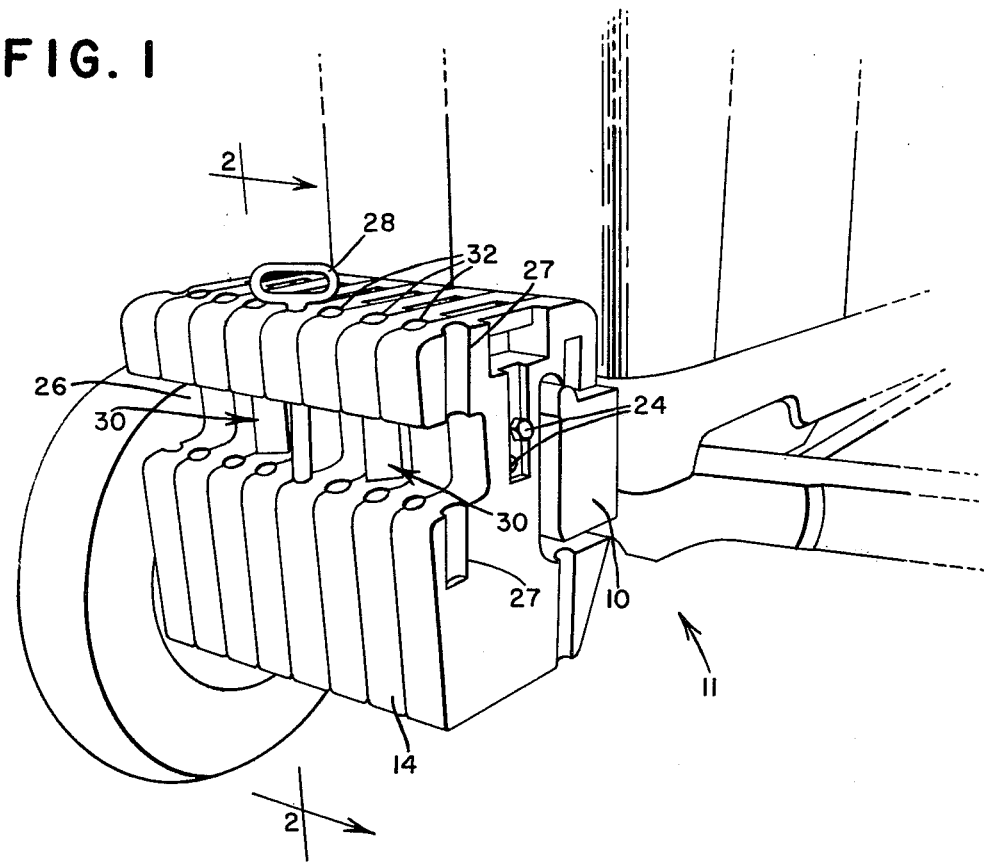
FIG. 1 is a perspective view of the weights mounted on a tractor.

Referring to FIG. 1, there is shown the front end of a tractor 11 having attached to its front end an elongate base weight 10 extending the whole transverse width of the tractor frame. Flat plate-shaped weights, designated at 14, are detachably mounted on the support 10.

Figure 2:
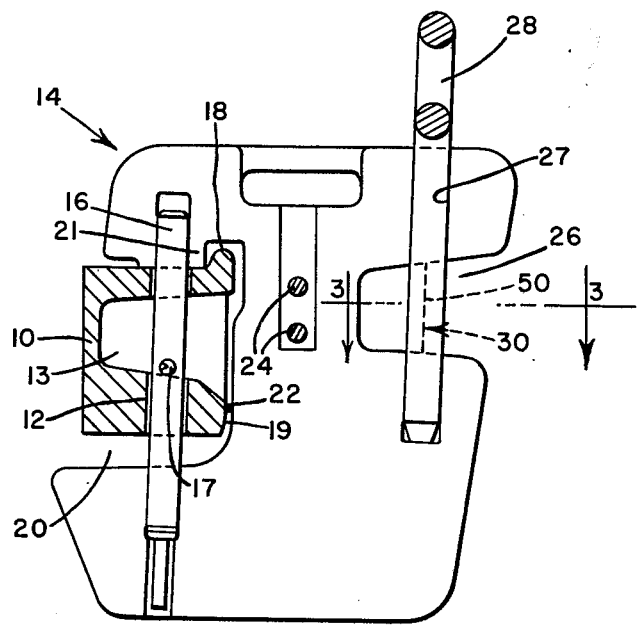
FIG. 2 is a section along line 2—2 of FIG. 1 showing a section of the base weight and a side view of a weight.

Referring to FIG. 2, there is shown a clevis 13 cast in the base weight 10 to serve as the primary implement hitch connection upon insertion of a hitch pin (not shown) through a bore 12 and a centering pin 16 which is inserted in the bore 12 to prevent transverse movement of the weights 14. The pin 16 has a centrally-located hole perpendicular to its longitudinal axis which contains a split pin 17 which holds the centering pin 16 from falling through the bore 12. Along the entire width of the upper part of the base weight 10 there is an upturned lip 18 and on the bottom part there is a bearing surface 19 also over the entire width.

In the rearward edge of each weight 14 there is a U-shaped recess 20 which is hook-shaped in the upper portion 21 to hang over the upturned lip 18 of the base weight 10 and the bearing surface 19 of the base weight 10 abuts the inner surface 22 of the U-shaped recess 20. The weights 14 are clamped together transversely by a pair of clamping screws 24.

In the forward edge of each weight 14 is another U-shaped recess 26 which in cooperation with other weights 14 form a hitching clevis. As best shown in FIG. 1, the weights 14 each have semi-cylindrical grooves 27 on either side near the recess 26 which form cylindrical vertical openings 32 in cooperation with adjacent weights 14. Each vertical opening 32 extends across the recess 26 and is open at the top and closed at the bottom below the recess 26.

Figure 3:
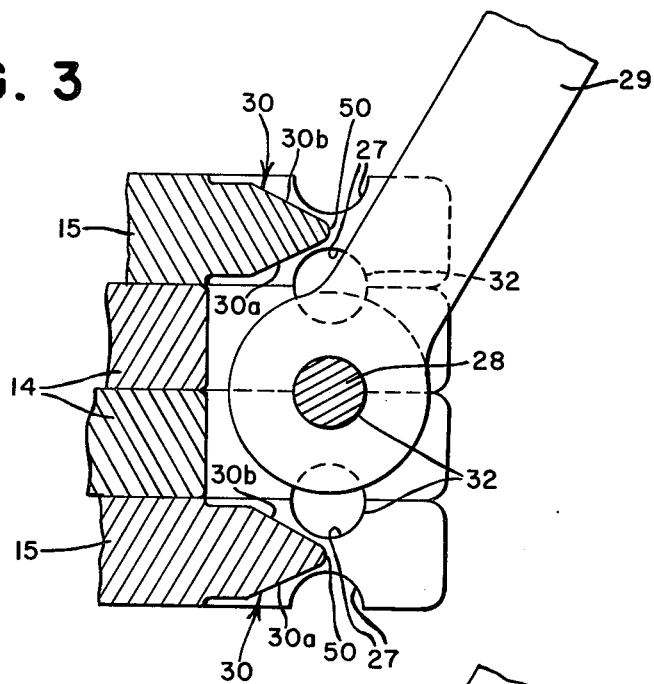
FIG. 3 is a section taken along line 3—3 of FIG. 2 including the deflector of the present invention.

During coupling, the hitch ring 29 as shown in FIG. 3 of an implement (not shown) will be inserted into the recess 26 such that the vertical center axis of the hitch ring 29 will coincide with the vertical center axis of the vertical opening 32. A hitch pin 28 is then inserted into the vertical opening 32 and through the hitch ring 29 to connect the implement to the weights 14.

Referring further to FIG. 3, there are shown weights 15 differing from the weights 14 in having integral deflectors 30 which are located in the recesses 26. The two weights 15 with the integral deflectors 30 are separated in such a manner that there are at least two non-deflector weights 14 in between so that the space between the deflectors 30 is adequate to take up the hitch ring 29.

Each deflector 30 is disposed parallel to the center axis of the vertical opening 32 and is of wedge shape, tapering to the front. Two outwardly inclined deflector surfaces 30a and b on the two deflectors 30 cooperate to provide a guide for the hitch ring 29. The front tip 50 of each of the deflectors 30 is rounded off and extends laterally in line with the center axis of the vertical opening 32. Two deflector surfaces 30a and b are provided on each deflector 30 so that the two deflector incorporated weights 15 will be interchangeable.

Through the use of the deflectors 30 the coupling maneuver is significantly simplified since a guide is provided which makes the hitch ring 29 self-centering in relation to the vertical opening 32 into which the hitch pin 28 will be inserted. With the deflectors 30 in place, sideward slipping of the hitch ring 29 is not possible and therefore possibilities of injuries to the operator from this source are minimized.

Figure 4:
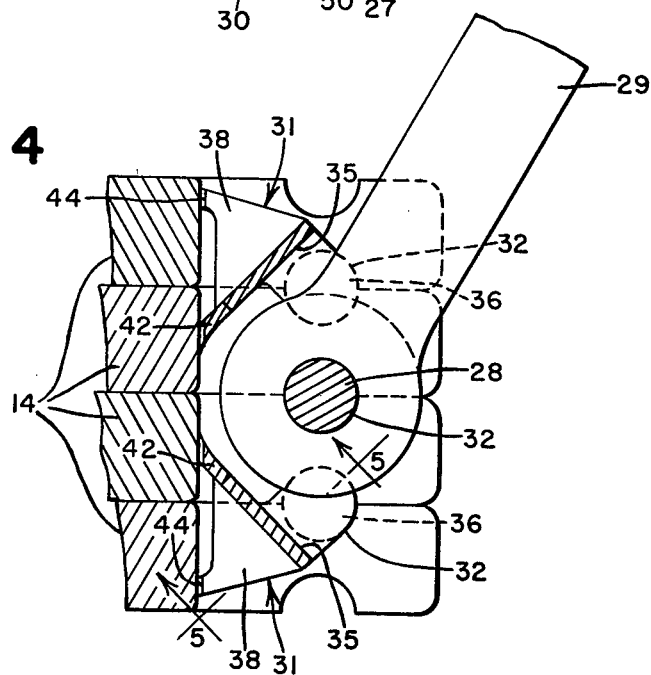
FIG. 4 is a section similar to FIG. 3 of an alternate embodiment of the present invention.
Figure 5:
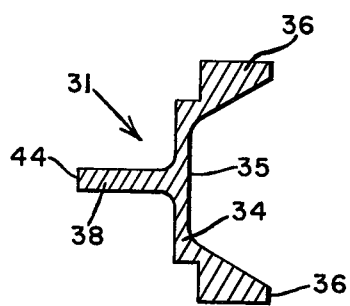
FIG. 5 is a section taken along the line 5—5 of FIG. 4 showing a cross section of the alternate embodiment.

In an alternate embodiment in FIG. 4, there are shown deflectors 31 which are insertable in the vertical openings 32 to both sides of the vertical opening 32 for the hitch pin 28. The deflectors 31 have cylindrical portions 36 at the top and bottom of a deflector flange 34. The cylindrical portions 36 are inserted into the vertical openings 32 such that there is one vertical opening 32 between them for insertion of the hitch pin 28. The deflector flange 34 has a deflector surface 35 disposed parallel to the center axis of the vertical opening 32 into which the hitch pin 28 is inserted and on the back is a supporting brace 38 with supporting areas 42 and 44. These supporting areas 42 and 44 abut the back of the recess 26 when the hitch ring 29 is inserted. The deflector 31 may be inserted between two weights 14 at any desired vertical opening 32 and forms together with the complementary deflector 31 a guide which limits the sideward movement of the hitch ring 29 in the recess 26.

Again through the use of deflectors 31 the coupling maneuver will be significantly simplified since the deflector surfaces 35 make the hitch ring 29 self-centering in relation to the hitch pin vertical opening 32. And again, sideward slipping through the hitching recess 26 of the weights 14 is impossible, and therefore injuries to the operator will be prevented.

While the invention has been described in conjunction with specific embodiments, it is to be understood that many alternatives, modifications, and variations will be apparent to those skilled in the art in light of the aforegoing descriptions. Accordingly, it is intended to embrace all such alternatives, modifications, and variations which fall within the spirit and scope of the appended claims.

I claim:

1. In a front-end weight assembly of the type including an elongate base weight adapted for connection to the forward end of a tractor and a plurality of plate-shaped weights, said base weight and said weights having cooperative surfaces disposed such that said weights may be suspended from said base weight, said weights having forwardly opening recesses in their forward edges forming recess means for receipt of an implement hitch ring and semi-cylindrical grooves disposed in the opposite transverse sides of each weight extending vertically in the region of each recess whereby opposed grooves in each two adjacent weights cooperate to form a vertical opening adapted to receive a hitch pin, the improvement comprising: a deflector positioned within the recess means and having a deflector surface disposed substantially parallel to the center axis of one of the vertical openings and spaced therefrom a distance greater than the radius of the hitch ring and outwardly inclined towards the front relative to the adjacent sides of the two adjacent weights forming the one of the vertical openings, said deflector surface operatively associated with the two adjacent weights to form a guide for positioning the vertical center axis of the hitch ring coincident with the center axis of the vertical opening for insertion of the hitch pin therethrough.

2. The invention as claimed in claim 1 wherein the deflector is located within the recess of and is integral with a first adjacent weight positioned adjacent to the two adjacent weights forming the one of the vertical openings.

3. The invention as claimed in claim 2 wherein the deflector has a second deflector surface forming with the deflector surface a wedge shape tapered towards the front of the weight and symmetrical about a vertical, transverse plane passing through the center of the first adjacent weight.

4. The invention as claimed in claim 3 including a second adjacent weight with a further deflector integral therewith positioned adjacent to the two adjacent weights forming the one of the vertical openings and opposite the first adjacent weight.

5. The invention as claimed in claim 1 including a first adjacent weight positioned adjacent to the two adjacent weights forming the one of the vertical openings and having a semicylindrical groove cooperating with one of the outer semicylindrical grooves in the two adjacent weights forming the one of the vertical openings to form a second one of the vertical openings, and wherein the deflector includes means insertable into the second one of the vertical openings to hold the deflector in place.

6. The invention as claimed in claim 5 wherein the deflector includes a supporting flange projecting rearwardly of and substantially perpendicular to the deflector surface for bracing the deflector surface against the first adjacent weight upon abutting of the hitch ring against the deflector surface.

7. The invention as claimed in claim 6 including a second adjacent weight positioned adjacent to the two adjacent weights and opposite the first adjacent weight, said second adjacent weight including a semi-cylindrical groove cooperating with another one of the outer semi-cylindrical grooves in the two adjacent weights forming the one of the vertical openings to form a third one of the vertical openings, and a second deflector insertable in the third one of the vertical openings having a deflector surface disposed parallel to the center axis of the vertical opening at a distance greater than the radius of the hitch ring and outwardly inclined towards the front relative the adjacent sides of the two adjacent weights forming the one of the vertical openings.

8. In a front-end weight assembly of the type including an elongate base weight adapted for connection to the forward end of a tractor and at least four plate-shaped weights, said base weight and said weights having cooperative surfaces disposed such that the weights may be suspended from said base weight, said weights having forwardly opening recesses in their forward edges forming recess means adapted to receive an implement hitch ring and semicylindrical grooves disposed in the opposite transverse sides of each weight extending vertically in the region of each recess whereby opposed grooves in each adjacent two weights cooperate to form a vertical opening adapted to receive a hitch pin, the improvement comprising: a pair of deflectors, each integral with one of the weights adjacent to the two adjacent weights forming the one of the vertical openings and in the recess means thereof, and each deflector having two deflector surfaces forming a wedge shape tapered towards the front of the one of the weights and symmetrical about a vertical, transverse plane passing through the center of each of the one of the weights, said deflector surfaces operatively associated with the two adjacent weights forming the one of the vertical openings to form a guide for positioning the center axis of the hitch ring coincident with the center axis of the one of the vertical openings for insertion of the hitch pin therethrough.

9. In a front-end weight assembly of the type including an elongate base weight adapted for connection to the forward end of a tractor and at least four plate-shaped weights, said base weight and said weights having cooperative surfaces disposed such that the weights may be suspended from the base weight, said weights having forwardly opening recesses in their forward edges forming recess means adapted to receive an implement hitch ring and semi-cylindrical grooves disposed in the opposite transverse sides of each weight extending vertically in the region of each recess whereby opposed grooves in two adjacent weights cooperate to form a center vertical opening adapted to receive a hitch pin and opposed grooves in first and second adjacent weights, each adjacent to the two adjacent weights, cooperate to form additional vertical openings, the improvement comprising: a pair of deflectors positioned proximate the recess means and having deflector surfaces disposed parallel to the center axis of the center vertical opening at a distance greater than the radius of the hitch ring and outwardly inclined towards the front relative to the adjacent sides of the two adjacent weights and having cylindrical top and bottom portions with center axes parallel to the deflector surfaces for insertion into the additional vertical openings, each said deflector including a supporting flange projecting rearwardly of and perpendicular to the deflector surface and abutting the respectively first and second adjacent weights, each said deflector surface operatively associated with the two adjacent weights to form a guide for positioning the center axis of the hitch ring coincident with the center axis of the central vertical opening for insertion of the hitch pin therethrough.

* * * * *